US012686348B2

(12) United States Patent
Umemoto et al.

(10) Patent No.: US 12,686,348 B2
(45) Date of Patent: Jul. 21, 2026

(54) ELECTRIC POWER SUPPLY DEVICE, CONTROL METHOD, AND NON-TRANSITORY STORAGE MEDIUM

(71) Applicants: TOYOTA JIDOSHA KABUSHIKI KAISHA, Toyota (JP); SUBARU CORPORATION, Tokyo (JP); DENSO TEN Limited, Kobe (JP)

(72) Inventors: Akira Umemoto, Nagakute (JP); Shinichi Inoue, Okazaki (JP); Shoya Shimosaka, Kobe (JP); Yukihiko Murakami, Toyota (JP)

(73) Assignees: TOYOTA JIDOSHA KABUSHIKI KAISHA, Toyota (JP); SUBARU CORPORATION, Tokyo (JP); DENSO TEN Limited, Kobe (JP)

( * ) Notice: Subject to any disclaimer, the term of this patent is extended or adjusted under 35 U.S.C. 154(b) by 747 days.

(21) Appl. No.: 18/187,081

(22) Filed: Mar. 21, 2023

(65) Prior Publication Data

US 2023/0331178 A1 Oct. 19, 2023

(30) Foreign Application Priority Data

Apr. 13, 2022 (JP) ................................. 2022-066240

(51) Int. Cl.
B60R 16/033 (2006.01)
B60R 16/00 (2006.01)
B60W 40/08 (2012.01)
(52) U.S. Cl.
CPC .......... B60R 16/033 (2013.01); B60R 16/005 (2013.01); B60W 40/08 (2013.01); B60W 2040/0881 (2013.01)

(58) Field of Classification Search
CPC ..... B60R 16/033; B60R 16/005; B60R 16/02; B60R 16/03; B60W 40/08; B60W 2040/0881
See application file for complete search history.

(56) References Cited

U.S. PATENT DOCUMENTS 6,838,783 B2 * 1/2005 Stierle ................. B60R 16/0315
307/10.1
8,097,974 B2 * 1/2012 Esaka ..................... H02J 7/667
307/10.6
(Continued)

FOREIGN PATENT DOCUMENTS

CA 2214750 A1 * 3/1998 .......... H02J 7/00306
JP 2005-1452 A 1/2005
(Continued)

OTHER PUBLICATIONS

U.S. Appl. No. 18/159,790, filed Jan. 26, 2023, Narematsu et al.

*Primary Examiner* — Jared Fureman
(74) *Attorney, Agent, or Firm* — Oblon, McClelland, Maier & Neustadt, L.L.P.

(57) ABSTRACT

An electric power supply device installed in a vehicle includes a relay provided between a high-voltage battery and one or more pieces of in-vehicle equipment, and a processor. The processor is configured to, based on a state of a main switch configured to operate a traveling system of the vehicle, switch on or off of the relay, and is configured to control electric power supply from the high-voltage battery to the one or more pieces of in-vehicle equipment. The processor is configured to supply electric power from the high-voltage battery to particular in-vehicle equipment during maintaining the relay on when the main switch is turned off during the relay being on and the one or more pieces of in-vehicle equipment include the particular in-vehicle equip- (Continued)

ment. The particular in-vehicle equipment is configured to operate after the main switch is turned off.

12 Claims, 4 Drawing Sheets

(56)                     References Cited

U.S. PATENT DOCUMENTS

| | | | | |
|---|---|---|---|---|
| 8,242,627 | B2 * | 8/2012 | Ichikawa | B60L 55/00 |
| | | | | 180/65.265 |
| 8,478,469 | B2 * | 7/2013 | Ueo | B60L 3/003 |
| | | | | 701/22 |
| 9,365,114 | B2 * | 6/2016 | Kim | B60R 25/24 |
| 10,173,535 | B2 * | 1/2019 | Chong | B60L 50/60 |
| 10,498,134 | B2 * | 12/2019 | Nozawa | H02P 27/06 |
| 11,447,021 | B2 * | 9/2022 | Kawai | B60L 50/60 |
| 11,584,256 | B2 * | 2/2023 | Kawai | B60L 58/18 |
| 11,664,541 | B2 * | 5/2023 | Kawai | B60L 58/22 |
| | | | | 429/90 |
| 11,752,998 | B2 * | 9/2023 | Ono | B60L 58/18 |
| | | | | 701/22 |
| 2014/0214251 | A1 * | 7/2014 | Sugiyama | B60L 58/15 |
| | | | | 903/930 |
| 2019/0181633 | A1 * | 6/2019 | Nozawa | H02P 29/68 |
| 2019/0359079 | A1 * | 11/2019 | Mitsutani | B60L 58/20 |
| 2023/0331178 | A1 * | 10/2023 | Umemoto | B60W 40/08 |

FOREIGN PATENT DOCUMENTS

| | | |
|---|---|---|
| JP | 2019-205275 A | 11/2019 |
| JP | 2020-120534 A | 8/2020 |
| JP | 2022-14677 A | 1/2022 |
| JP | 2022-14678 A | 1/2022 |

* cited by examiner

ELECTRIC POWER SUPPLY DEVICE, CONTROL METHOD, AND NON-TRANSITORY STORAGE MEDIUM

CROSS-REFERENCE TO RELATED APPLICATION

This application claims priority to Japanese Patent Application No. 2022-066240 filed on Apr. 13, 2022, incorporated herein by reference in its entirety.

BACKGROUND

1. Technical Field

The present disclosure relates to an electric power supply device, a control method, and a non-transitory storage medium installed in a vehicle.

2. Description of Related Art

Japanese Unexamined Patent Application Publication No. 2019-205275 discloses an electric power supply device that performs so-called feeding control in which, when electric power consumption of in-vehicle equipment that uses an auxiliary battery as an electric power source is greater than a predetermined value in a state in which a main switch of the vehicle is turned off and the vehicle is not capable of traveling, electric power is supplied from a high-voltage battery to the in-vehicle equipment while the electric power consumption is great.

SUMMARY

In order to perform feeding control, there is a need to switch an on/off state of a system main relay (SMR) provided between the in-vehicle equipment of which the auxiliary battery is the electric power supply, and the high-voltage battery, each time feeding control is performed. In order to extend the component life of this system main relay, the number of times the system main relay is operated is preferably maximally reduced, to reduce the effects of heat generation due to switching. Accordingly, there is room for improvement in the manner in which feeding control is implemented.

The present disclosure provides an electric power supply device, a control method, and a non-transitory storage medium, capable of suppressing an increase in the number of times that the system main relay operates due to the implementation of feeding control, and reducing the effects on the component life of the system main relay.

A first aspect of the present disclosure is an electric power supply device installed in a vehicle. The electric power supply device includes a relay provided between a high-voltage battery and one or more pieces of in-vehicle equipment, and a processor. The processor is configured to, based on a state of a main switch configured to operate a traveling system of the vehicle, switch on or off of the relay, and is configured to control electric power supply from the high-voltage battery to the one or more pieces of in-vehicle equipment. The processor is configured to supply electric power from the high-voltage battery to particular in-vehicle equipment during maintaining the relay on when the main switch is turned off during the relay being turned on and the one or more pieces of in-vehicle equipment include the particular in-vehicle equipment. The particular in-vehicle equipment is configured to operate after the main switch is turned off.

In the first aspect, the processor may be configured to maintain the relay on when a predetermined operation is performed with respect to the vehicle during the relay being turned off and the particular in-vehicle equipment is present, even in a case where the main switch is turned on after turning on the relay to supply electric power from the high-voltage battery to the particular in-vehicle equipment.

In the first aspect, the processor may be configured to turn off the relay when electric power is being supplied from the high-voltage battery to the particular in-vehicle equipment for a predetermined time.

In the first aspect, the processor may be configured to determine whether the particular in-vehicle equipment is present while the main switch is turned on.

In the first aspect, the processor may be configured to determine whether the particular in-vehicle equipment is present based on whether a request is made to supply electric power from the high-voltage battery to the particular in-vehicle equipment.

In the first aspect, the particular in-vehicle equipment may be equipment that is configured to operate when an occupant exits the vehicle.

In the first aspect, the particular in-vehicle equipment may be equipment that is configured to operate when an occupant enters the vehicle.

In the first aspect, the particular in-vehicle equipment may be equipment that is configured to operate when an occupant exits and enters the vehicle.

A second aspect of the present disclosure is a control method executed by a computer of an electric power supply device installed in a vehicle. The control method includes determining a state of a main switch configured to operate a traveling system of the vehicle, determining to switch on or off a relay based on the state of the main switch, determining, when the main switch is turned off during the relay being turned on, whether particular in-vehicle equipment that operates after the main switch is turned off is present among one or more pieces of in-vehicle equipment, and determining, when the particular in-vehicle equipment that operates after the main switch is turned off is present, to supply electric power from the high-voltage battery to the particular in-vehicle equipment during maintaining the relay on. The relay is provided between a high-voltage battery and the one or more pieces of in-vehicle equipment.

A third aspect of the present disclosure is a non-transitory storage medium storing instructions that are executable by one or more processors in a computer of an electric power supply device installed in a vehicle and that cause the one or more processors to perform the following functions. The functions include determining a state of a main switch configured to operate a traveling system of the vehicle, determining to switch on or off a relay based on the state of the main switch, determining, when the main switch is turned off during the relay being turned on, whether particular in-vehicle equipment that operates after the main switch is turned off is present among one or more pieces of in-vehicle equipment, and determining, when the particular in-vehicle equipment that operates after the main switch is turned off is present, to supply electric power from the high-voltage battery to the particular in-vehicle equipment during maintaining the relay on. The relay is provided between a high-voltage battery and the one or more pieces of in-vehicle equipment.

According to the first, second, and third aspects of the present disclosure, an increase in the number of times the system main relay operates due to the implementation of feeding control can be suppressed, thereby reducing the effects on the component life of the system main relay.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Some in-vehicle auxiliary loads use an auxiliary battery as a main electric power supply, and an electric power supply device according to the present disclosure performs feeding control in which, when there is a particular auxiliary load that operates when occupants of the vehicle are exiting the vehicle, electric power is supplied from a high-voltage battery to the particular auxiliary load with a system main relay maintained in an on state, without switching the system main relay from on to off. This control enables the number of times that the system main relay is operated when feeding control is implemented to be suppressed.

An embodiment of the present disclosure will be described below in detail with reference to the drawings.

Embodiment

Configuration

Figure 1:
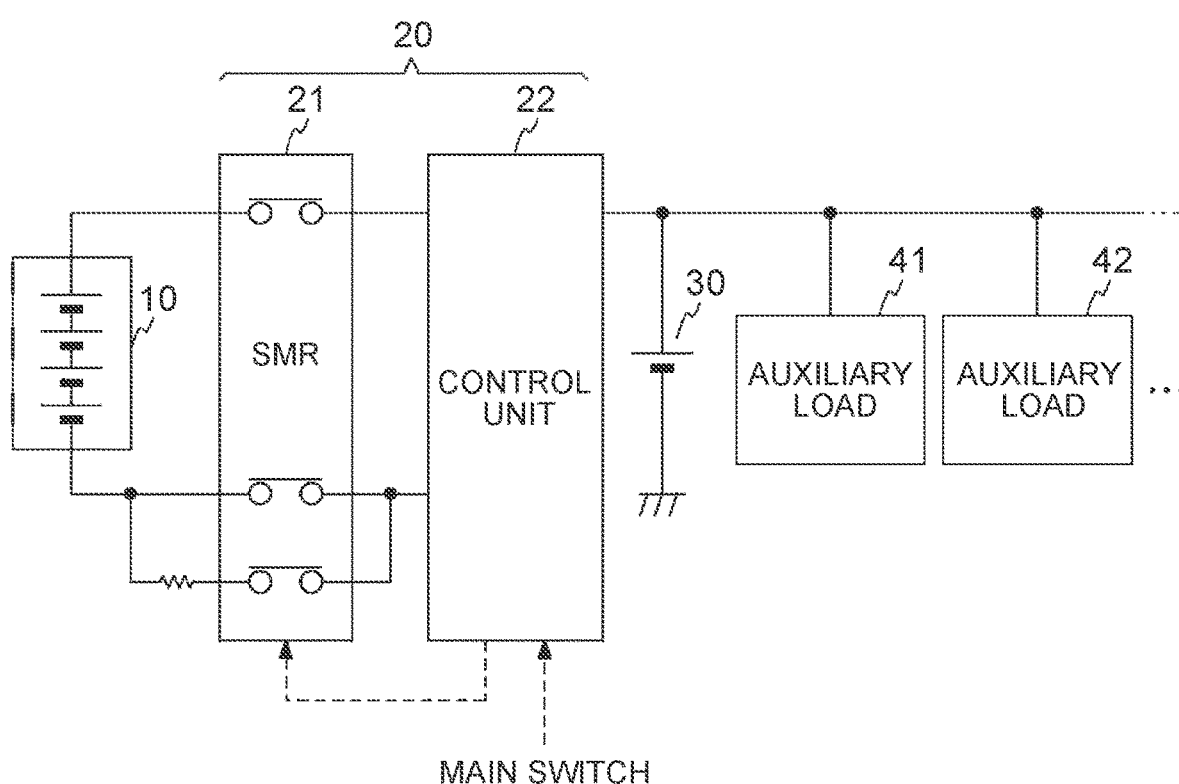
FIG. 1 is a functional block diagram of an electric power supply device and peripheral components thereof according to an embodiment of the present disclosure.

FIG. 1 is a functional block diagram of an electric power supply device 20 and peripheral components thereof according to the embodiment of the present disclosure. The functional block exemplified in FIG. 1 includes a high-voltage battery 10, an electric power supply device 20, an auxiliary battery 30, and a plurality of auxiliary loads 41 and 42. Note that in FIG. 1, signal lines for electric power are indicated by continuous lines, and signal lines for control and communication are indicated by dashed lines. The electric power supply device 20 can be installed in a vehicle such as a hybrid electric vehicle (HEV), a plug-in hybrid electric vehicle (PHEV), a battery electric vehicle (BEV), and so forth, that use an electric motor as a motive power source, for example.

The high-voltage battery 10 is a secondary battery, such as a lithium-ion battery or the like, which is configured to be rechargeable, and is a driving battery that supplies electric power to so-called main devices (omitted from illustration) such as a starter motor, a traction electric motor, and so forth, installed in the vehicle. This high-voltage battery 10 can supply electric power to the main devices via a system main relay 21, which will be described later. This high-voltage battery 10 can also supply electric power to a control unit 22, which will be described later, via the system main relay 21.

The auxiliary battery 30 is a secondary battery such as a lead-acid battery, a lithium-ion battery, or the like, for example, which is configured to be rechargeable, and is a battery that supplies electric power to so-called auxiliary equipment installed in the vehicle, including the auxiliary loads 41 and 42. This auxiliary battery 30 can be charged with the electric power of the high-voltage battery 10. Generally, the rated voltage of the auxiliary battery 30 is set to be lower than that of the high-voltage battery 10.

The auxiliary loads 41 and 42 are equipment installed in the vehicle, and are devices, appliances, and so forth that consume electric power necessary to perform predetermined actions. The auxiliary loads 41 and 42 include, for example, particular in-vehicle equipment that operates in conjunction with fixed action patterns, such as when opening/closing doors of the vehicle, when turning an ignition switch on/off, and so forth (e.g., electronic outer mirrors, exiting assistance system, etc.). The auxiliary loads 41 and 42 operate under electric power supplied from the electric power supply device 20 or electric power stored in the auxiliary battery 30. Although FIG. 1 illustrates an example in which two auxiliary loads 41 and 42 are installed in the vehicle, the number of auxiliary loads installed in the vehicle is not limited.

The electric power supply device 20 is a device for controlling charging and discharging of the high-voltage battery 10 and the auxiliary battery 30 to manage electric power balance of the vehicle. The electric power supply device 20 according to the present embodiment includes the system main relay (SMR) 21 and the control unit 22.

The system main relay 21 is a switching device for controlling the state of exchange of electric power at the high-voltage battery 10, and is provided between the high-voltage battery 10 and the control unit 22. The system main relay 21 can switch between a state in which input/output terminals are electrically connected (on) and a state in which the input/output terminals are electrically disconnected (off), based on instructions from the control unit 22.

The control unit 22 is configured to control electric power supply from the high-voltage battery 10 to the auxiliary battery 30 and the auxiliary loads 41 and 42. The control unit 22 switches the on/off state of the system main relay 21 based on an on/off state of the ignition switch (IG) that is a main switch for activating a system related to traveling of the vehicle (hereinafter referred to as "vehicle traveling system"), setting states of the auxiliary loads 41 and 42 regarding operations enabled/disabled, and so forth. Also, the control unit 22 can supply electric power of a predetermined voltage from the high-voltage battery 10 to the auxiliary battery 30 and the auxiliary loads 41 and 42 when the system main relay 21 is turned on. When supplying electric power, the control unit 22 can convert the voltage of the high-voltage battery 10, which is the input voltage, into a predetermined voltage specified for the auxiliary battery 30 (direct current (DC)-to DC conversion), and output the converted voltage.

Part or all of this control unit 22 may be made up of an electronic control unit (ECU) typically including a processor such as a microcontroller, memory, an input/output interface, and so forth. The electronic control unit can realize part or all of the functions described above by the processor reading and executing programs stored in the memory. Also, the memory is a non-transitory storage medium that is computer-readable.

Control

Next, control to be executed by the electric power supply device 20 according to the present embodiment will be described with reference to FIGS. 2 to 4. Description of the control executed by the electric power supply device 20 can be divided into description of vehicle-exiting control and description of vehicle-entering control. Note that in the following description, when an occupant such as a driver gets off a vehicle, this will be referred to as "when the occupant exits the vehicle", when the occupant gets on the vehicle, this will be referred to as "when the occupant enters the vehicle", and the two will be collectively referred to as "when the occupant enters/exits the vehicle".

(1) Vehicle-Exiting Control

Figure 2:
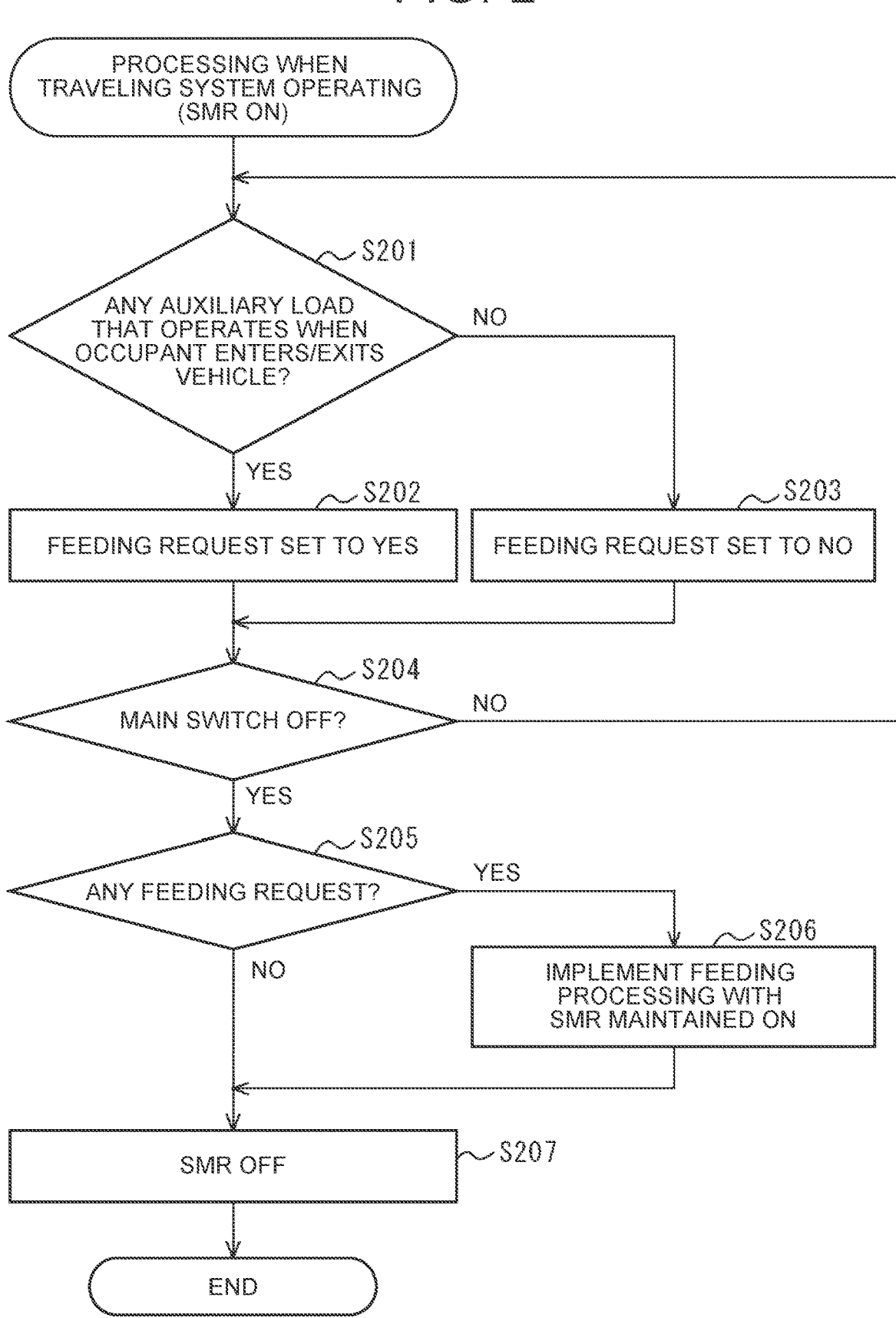
FIG. 2 is a processing flowchart of vehicle-exiting control executed by the electric power supply device when a system main relay is in an on state.

FIG. 2 is a flowchart showing processing procedures of control executed by the control unit 22 of the electric power supply device 20 when an occupant is exiting the vehicle (vehicle-exiting control), in a state in which the traveling system of the vehicle is in operation (in a state capable of traveling), and the system main relay 21 is connected (SMR on).

Step S201

The control unit 22 of the electric power supply device 20 determines whether there is an auxiliary load (particular in-vehicle equipment) that operates when the occupant enters/exits the vehicle, among the auxiliary loads 41 and 42 installed in the vehicle. More specifically, the control unit 22 determines whether there is an auxiliary load that operates after the main switch that operates the traveling system of the vehicle is turned off. Examples of an auxiliary load that can be the object of this determination include an electronic exterior mirror, an exiting assistance system, and so forth. Note that in some vehicles, a user such as a driver of the vehicle can customize settings of whether to operate the auxiliary loads that can be the object of determination when the occupant enters and/or exits the vehicle. The control unit 22 of the present embodiment is capable of handling such customization settings, and comprehends whether settings have been performed for each auxiliary load such that the auxiliary load operates when the occupant enters/exits the vehicle, in a period during which the main switch of the traveling system of the vehicle that is operating is turned on. The setting and management of whether operation of each auxiliary load is enabled/disabled may be performed by the control unit 22, or may be performed by another configuration that is omitted from illustration.

When the control unit 22 determines that there is an auxiliary load that is set to be operated when the occupant enters/exits the vehicle (YES in step S201), the processing advances to step S202. On the other hand, when the control unit 22 determines that there is no auxiliary load that is set to be operated when the occupant enters/exits the vehicle (NO in step S201), the processing advances to step S203.

Step S202

The control unit 22 of the electric power supply device 20 sets a so-called feeding request to "yes", to request electric power supply from the high-voltage battery 10 to the auxiliary battery 30 side when the occupant enters/exits the vehicle, i.e., to request supply of electric power to the auxiliary load that is set to operate when the occupant enters/exits the vehicle. This feeding request can be set to "yes" by setting a predetermined flag, for example. Upon the control unit 22 setting the feeding request to "yes", the processing advances to step S204.

Step S203

The control unit 22 of the electric power supply device 20 sets "no" to the feeding request for requesting electric power supply from the high-voltage battery 10 to the auxiliary battery 30 side when the occupant enters/exits the vehicle. This feeding request can be set to "no" by not setting a predetermined flag, for example. Upon the control unit 22 setting the feeding request to "no", the processing advances to step S204.

Note that the above-described feeding request may be set independently for auxiliary loads that operate when the occupant exits the vehicle, and auxiliary loads that operate when the occupant enters the vehicle. By setting feeding requests separately for when the occupant exits the vehicle and when the occupant enters the vehicle, unnecessarily implementing feeding processing can be averted.

Step S204

The control unit 22 of the electric power supply device 20 determines whether the main switch that operates the traveling system of the vehicle has been turned off. That is to say, the control unit 22 determines whether the vehicle has transitioned to a state in which the vehicle cannot travel (a parked state, etc.) in order for the occupant to exit the vehicle. The ignition switch (IG) of the vehicle can be exemplified as this main switch.

When the control unit 22 determines that the main switch is turned off (IG off) (YES in step S204), the processing advances to step S205. On the other hand, when the control unit 22 determines that the main switch is not turned off (IG on) (NO in step S204), the processing advances to step S201.

Step S205

The control unit 22 of the electric power supply device 20 determines whether the feeding request requesting power supply from the high-voltage battery 10 to the auxiliary battery 30 side is set to "yes", in determination made in a period when the main switch was turned on. When feeding requests are set independently for when the occupant exits the vehicle and for when the occupant enters the vehicle, determining whether there is a feeding request for when the occupant exits the vehicle is sufficient for this step.

When the control unit 22 determines that the feeding request is set to "yes" (YES in step S205), the processing advances to step S206. On the other hand, when the control unit 22 determines that the feeding request is set to "no" (NO in step S205), the processing advances to step S207.

Step S206

The control unit 22 of the electric power supply device 20 maintains the connected state (SMR on) of the system main relay 21, while implementing feeding processing from the high-voltage battery 10 to the auxiliary battery 30 side, i.e., supplying electric power for at least auxiliary loads that operate when the occupant exits the vehicle. The time, timing, and so forth, at which this feeding processing is to be implemented, are set for each auxiliary load based on, for example, regulations and vehicle specifications. As an example, electronic exterior mirrors are required to operate continuously a maximum of 7 minutes both when the occupant exits the vehicle and when the occupant enters the vehicle. Also, the exiting assistance system is required to operate continuously for a maximum of 3 minutes only when the occupant exits the vehicle. Note that from the viewpoint of protecting the auxiliary battery 30 from deterioration, the time during which the feeding processing is to be implemented may be set longer than the time during which actions of the auxiliary load that operates when the occupant exits the vehicle continue. When control unit 22 implements the feeding processing from the high-voltage battery 10 until the actions of the auxiliary load that operates when the occupant exits the vehicle end, the processing advances to step S207.

Step S207

The control unit 22 of the electric power supply device 20 cuts off the system main relay 21 (SMR off). This electrically isolates the high-voltage battery 10 from the system. When the control unit 22 cuts off the system main relay 21, the vehicle-exiting control ends.

In this vehicle-exiting control, when it is known before the occupant exits the vehicle that implementation of feeding processing will be necessary when the occupant exits the vehicle, feeding processing is implemented with the state of the system main relay 21 maintained in the on state, without temporarily switching to off from on when the act of exiting (IG on) is determined and then turning on again. Thus, the number of times the system main relay 21 is operated can be reduced.

Note that in the above embodiment, an example is described in which determination is made whether to set a feeding request based on the results of step S201 regarding whether there is even one auxiliary load (particular in-vehicle equipment) that operates when the occupant enters/exits the vehicle. However, instead of this determination, whether to set a feeding request may be determined based on whether the total electric power consumption of one or more auxiliary loads that operate when the occupant enters/exits the vehicle exceeds a predetermined value.

(2) Vehicle-Entering Control

Figure 3:
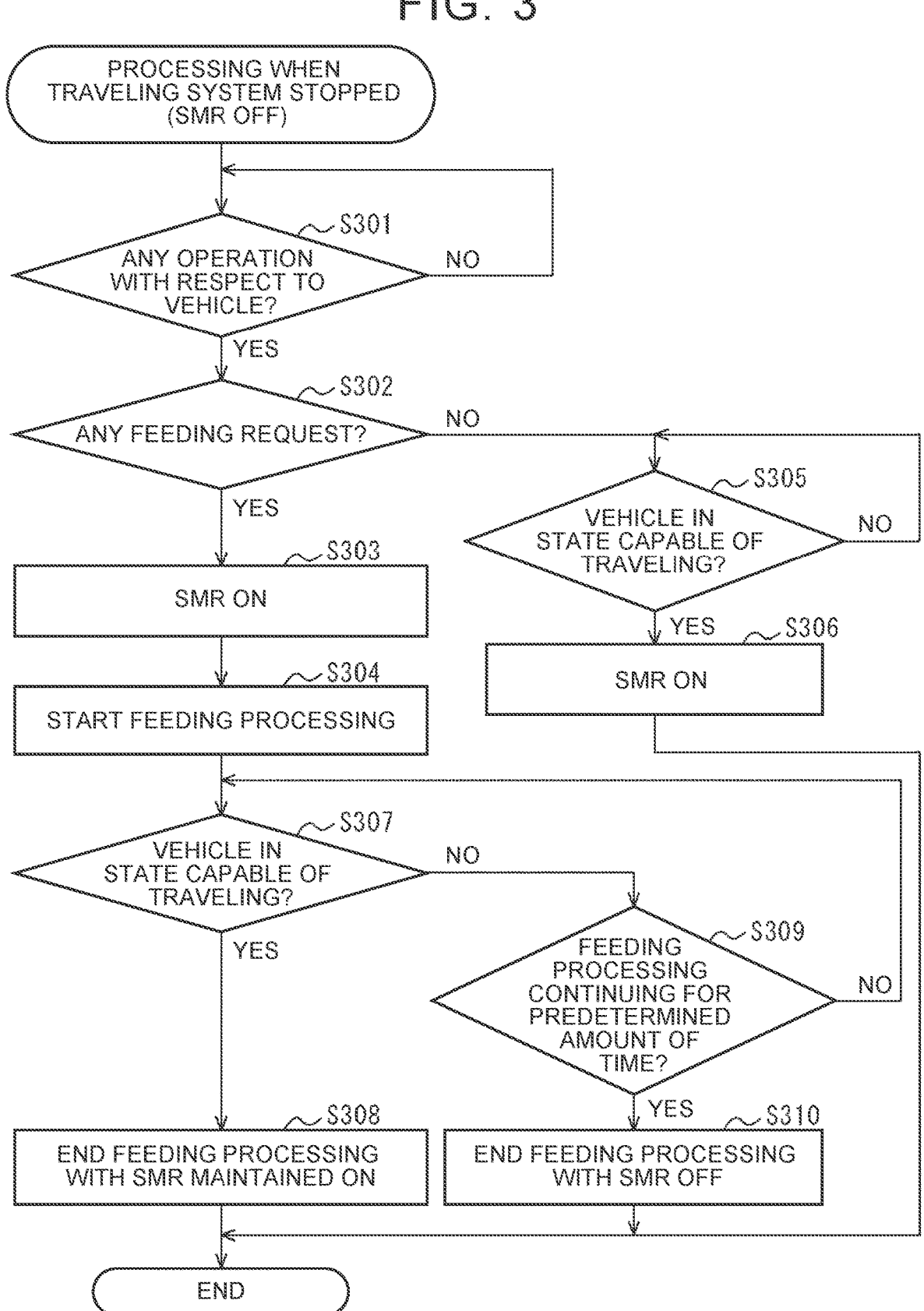
FIG. 3 is a processing flowchart of vehicle-entering control executed by the electric power supply device when the system main relay is in an off state.

FIG. 3 is a flowchart showing processing procedures of control executed by the control unit 22 of the electric power supply device 20 when an occupant is entering the vehicle (vehicle-entering control), in a state in which the traveling system of the vehicle is stopped (in a state incapable of traveling), and the system main relay 21 is cut off (SMR off).

Step S301

The control unit 22 of the electric power supply device 20 determines whether a predetermined operation has been performed with respect to the vehicle. This determination is made to determine the possibility that the vehicle user or the like will enter the vehicle. Examples of predetermined operations include operations by which accessing the vehicle from the outside can be recognized, such as an operation of unlocking a vehicle door using an electronic key or the like, an operation of gripping a door handle to open a vehicle door, or the like. The control unit 22 may determine by itself that a predetermined operation has been performed with respect to the vehicle, or the control unit 22 may acquire a determination made by a configuration that is omitted from illustration.

When the control unit 22 determines that a predetermined operation has been performed with respect to the vehicle (YES in step S301), the processing advances to step S302. On the other hand, when the control unit 22 determines that no predetermined operation has yet been performed with respect to the vehicle (NO in step S301), the determination of step S301 is repeated.

Step S302

The control unit 22 of the electric power supply device 20 determines whether the feeding request requesting electric power supply from the high-voltage battery to the auxiliary battery 30 side is set to "yes", in determination made in a period when the main switch was turned on, such as the previous time the vehicle traveled or the like. When feeding requests are set independently for when the occupant exits the vehicle and for when the occupant enters the vehicle, determining whether there is a feeding request for when the occupant enters the vehicle is sufficient for this step.

When the control unit 22 determines that the feeding request is set to "yes" (YES in step S302), the processing advances to step S303. On the other hand, when the control unit 22 determines that the feeding request is set to "no" (NO in step S302), the processing advances to step S305.

Step S303

The control unit 22 of the electric power supply device 20 connects the system main relay 21 (SMR on) when the feeding request is set to "yes". This electrically connects the high-voltage battery 10 to the system. Upon the control unit 22 connecting the system main relay 21, the processing advances to step S304.

Step S304

The control unit 22 of the electric power supply device 20 starts feeding processing for supplying electric power from the high-voltage battery 10 to the auxiliary battery 30 side, i.e., to the auxiliary load that operates when the occupant enters the vehicle. Upon the control unit 22 starting the feeding processing for the auxiliary load that operates when the occupant enters the vehicle, the processing advances to step S307.

Step S305

The control unit 22 of the electric power supply device 20 determines whether the vehicle is in a state of being capable of traveling when the feeding request is set to "no". An example of a state in which the vehicle is capable of traveling is a Ready-ON state.

When the control unit 22 determines that the vehicle is in a state capable of traveling (Ready-ON) (YES in step S305), the processing advances to step S306. On the other hand, when the control unit 22 determines that the vehicle is not in a state capable of traveling (Ready-OFF) (NO in step S305), the determination of step S305 is repeated.

Step S306

When the vehicle is in a state capable of traveling (Ready-ON), the control unit 22 of the electric power supply device 20 connects the system main relay 21 (SMR on). This electrically connects the high-voltage battery 10 to the system. Upon the control unit 22 connecting the system main relay 21, the vehicle-entering control ends.

Step S307

After starting the feeding processing, the control unit 22 of the electric power supply device 20 determines whether the vehicle is now in a state capable of traveling. An example of a state in which the vehicle is capable of traveling is a Ready-ON state.

When the control unit 22 determines that the vehicle is in a state capable of traveling (Ready-ON) (YES in step S307), the processing advances to step S308. On the other hand, when the control unit 22 determines that the vehicle is not in a state capable of traveling (Ready-OFF) (NO in step S307), the processing advances to step S309.

Step S308

The control unit 22 of the electric power supply device 20 maintains the connected state (SMR on) of the system main relay 21, and ends feeding processing for supplying electric power from the high-voltage battery 10 to the auxiliary battery 30 side, i.e., to the auxiliary load that operates at least when the occupant enters the vehicle. Upon the control unit 22 ending the feeding processing to the auxiliary load that operates when the occupant enters the vehicle, the vehicle-entering control ends.

Step S309

The control unit 22 of the electric power supply device 20 determines whether the feeding processing for supplying electric power from the high-voltage battery to the auxiliary battery 30 side, i.e., to the auxiliary load that operates when the occupant enters the vehicle, has been continuously implemented for a predetermined amount of time. This determination is made in order to avert the feeding processing from being implemented for an unnecessarily long time until the vehicle is in a state capable of traveling due to, for example, actions opening and closing the vehicle door over a long amount of time, and so forth. Accordingly, this predetermined amount of time can be appropriately set based on, for example, regulations, vehicle specifications, etc., while taking into consideration the state of charge of the high-voltage battery 10 and the auxiliary battery 30.

When the control unit 22 determines that the feeding processing has been continuously implemented for the predetermined amount of time (YES in step S309), the processing advances to step S310. On the other hand, when the control unit 22 determines that the feeding processing has not been continuously implemented for the predetermined amount of time (NO in step S309), the processing advances to step S307.

Step S310

The control unit 22 of the electric power supply device 20 cuts off the system main relay 21 (SMR off), and ends the feeding processing for supplying electric power from the high-voltage battery 10 to the auxiliary battery 30 side, i.e., to the auxiliary load that operates when the occupant enters the vehicle. When the system main relay 21 is cut off by the control unit 22 and the feeding processing to the auxiliary load that operates when the occupant enters the vehicle ends, the vehicle-entering control ends.

In this vehicle-entering control, when it is known before the occupant enters the vehicle that implementing feeding processing will be necessary when the occupant enters the vehicle, even when there is an instruction to make the vehicle capable of traveling (Ready-ON) partway through implementing feeding processing prior to the occupant entering the vehicle, the system main relay 21 is not switched to off from on and then returned to on again, but instead the on state of the relay is maintained, and the vehicle is transitioned to a state capable of traveling. Thus, the number of times the system main relay 21 is operated can be reduced.

(3) Application Example of Vehicle-Exiting Control

Figure 4:
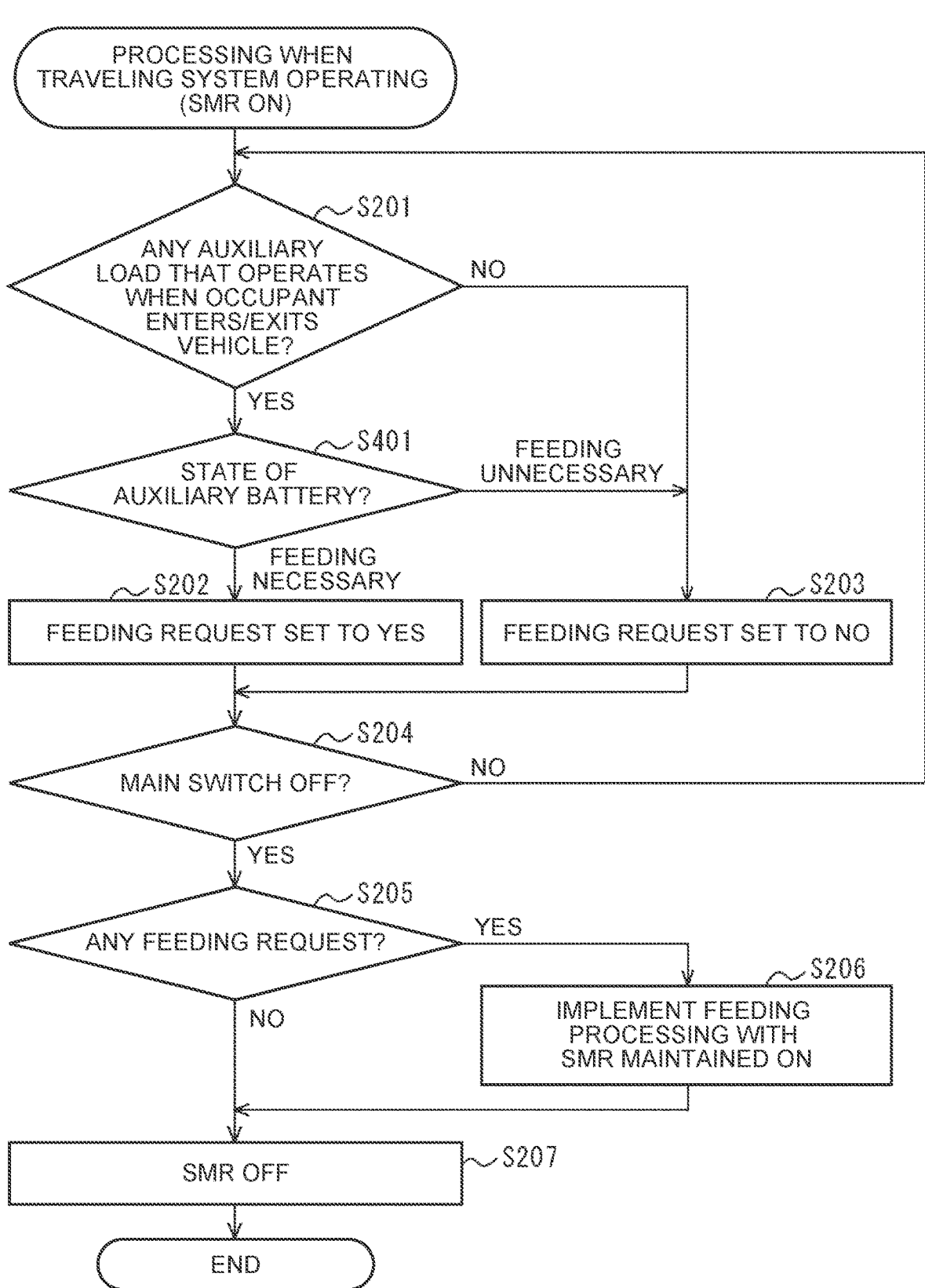
FIG. 4 is a processing flowchart of an application example of the vehicle-exiting control executed by the electric power supply device when the system main relay is in an on state.

FIG. 4 is a flowchart showing processing procedures of an application example of vehicle-exiting control executed by the control unit 22 of the electric power supply device 20 when the occupant exits the vehicle, described with reference to FIG. 2. The application example of the vehicle-exiting control shown in FIG. 4 differs from the vehicle-exiting control shown in FIG. 2 in that processing of step S401 is added after step S201.

In this application example of vehicle-exiting control, when determination is made that there is an auxiliary load that operates when the occupant exits the vehicle (YES in step S201), determination is further made regarding whether the feeding request should be set to "yes", based on the state of the auxiliary battery 30 (step S401). As an example, when a state of charge (SOC) of the auxiliary battery 30 is a fully-charged state, and the electric power stored in the auxiliary battery 30 is sufficient to supply electric power to the auxiliary load that operates when the occupant exits the vehicle, determination is made in step S401 that feeding is unnecessary. Thus, the number of times the system main relay 21 is operated can be reduced by this determination.

In step S401, a comprehensive determination may be made as to whether the feeding request should be set to "yes", taking into consideration not only the state of the auxiliary battery 30, but also the state of the high-voltage battery 10, the total value of electric power consumed by the auxiliary loads that operate when the occupant exits the vehicle and/or enters the vehicle, the operation timing of each auxiliary load, and so forth. As an example, even if the state of charge (SOC) of the auxiliary battery 30 is a fully-charged state, when the total value of the electric power consumed by the auxiliary loads that operate when the occupant exits the vehicle is greater than a predetermined value (which can be set based on the performance, capacity, and so forth of the auxiliary battery 30), determination may be made that feeding is necessary. According to this determination, a situation in which the auxiliary battery 30 goes dead can be averted.

Note that the control unit 22 of the electric power supply device 20 can acquire or calculate physical quantities (voltage value, current value, state of charge, etc.) indicating the state of the high-voltage battery 10 and the auxiliary battery 30, based on detection values from various types of sensors (omitted from illustration) that detect voltage, current, temperature, and so forth, which the high-voltage battery 10 and the auxiliary battery are provided with, for example.

Operations and Effects

As described above, according to the electric power supply device 20 of the embodiment of the present disclosure, when the main switch is turned off (IG off) in a state in which the system main relay 21 is turned on when the occupant exits the vehicle, and there is an auxiliary load (particular in-vehicle equipment) among the auxiliary loads 41 and 42 of which the auxiliary battery 30 serves as the main power supply, which operates when the occupant exits the vehicle after the main switch is turned off, feeding control is performed to supply electric power from the high-voltage battery 10 to the auxiliary load that operates when the occupant exits the vehicle, while maintaining the system main relay 21 in the on state.

Further, according to the electric power supply device 20 according to the embodiment of the present disclosure, when, at the time of entering the vehicle, there is an instruction (Ready-ON) to make the vehicle capable of traveling while in a state of performing feeding control for supplying electric power from the high-voltage battery 10 to the auxiliary load (particular in-vehicle equipment) that operates when the occupant enters the vehicle, control is performed to transition the vehicle to a state capable of traveling, while maintaining the system main relay 21 in the on state.

Through such control, increase in the number of times of on/off switching of the system main relay 21 for implementation of feeding control can be suppressed, and effects on the component life of the system main relay 21 can be reduced.

Although an embodiment of the present disclosure has been described above, the present disclosure can be understood as being an electric power supply device, a control method to be executed by a control unit of the electric power supply device including a processor and memory, a control program for executing the control method, a computer-readable non-transitory recording medium that stores the control program, and a vehicle equipped with the electric power supply device.

The electric power supply device according to the present disclosure can be used in a vehicle or the like equipped with an auxiliary load that may be operated when the occupant enters/exits the vehicle.

What is claimed is:

1. An electric power supply device installed in a vehicle, comprising:

a relay disposed between a high-voltage battery and one or more pieces of in-vehicle equipment; and a processor configured to:

switch the relay on or off based on a state of a main switch configured to operate a traveling system of the vehicle;

control an electric power supply from the high-voltage battery to the one or more pieces of in-vehicle equipment; and when the main switch is turned off while the relay is in an on state and the one or more pieces of in-vehicle equipment include a particular in-vehicle equipment configured to operate after the main switch is turned off, supply electric power from the high-voltage battery to the particular in-vehicle equipment while maintaining the relay in the on state.

2. The electric power supply device according to claim 1, wherein the processor is further configured to, when a predetermined operation with respect to the vehicle is performed while the relay is in an off state and the particular in-vehicle equipment is present, turn the relay on to supply electric power to the particular in-vehicle equipment and maintain the relay in the on state even if the main switch is subsequently turned on.

3. The electric power supply device according to claim 2, wherein the predetermined operation is an external operation performed on the vehicle, and the predetermined operation includes an operation of unlocking a vehicle door using an electronic key, and an operation of opening the vehicle door via a door handle.

4. The electric power supply device according to claim 1, wherein the processor is further configured to turn the relay off after electric power has been supplied from the high-voltage battery to the particular in-vehicle equipment for a predetermined time.

5. The electric power supply device according to claim 1, wherein the processor is further configured to determine whether the particular in-vehicle equipment is present while the main switch is in an on state.

6. The electric power supply device according to claim 1, wherein the processor is further configured to determine whether the particular in-vehicle equipment is present based on whether a request to supply electric power from the high-voltage battery to the particular in-vehicle equipment has been made.

7. The electric power supply device according to claim 1, wherein the particular in-vehicle equipment is configured to operate when an occupant exits the vehicle.

8. The electric power supply device according to claim 1, wherein the particular in-vehicle equipment is configured to operate when an occupant enters the vehicle.

9. The electric power supply device according to claim 1, wherein the particular in-vehicle equipment is is configured to operate when an occupant exits and enters the vehicle.

10. The electric power supply device according to claim 1, wherein the particular in-vehicle equipment includes electronic outer mirrors.

11. A control method executed by a computer of an electric power supply device installed in a vehicle, the control method comprising:

determining a state of a main switch configured to operate a traveling system of the vehicle;

switching a relay, disposed between a high-voltage battery and one or more pieces of in-vehicle equipment, on or off based on the state of the main switch;

when the main switch is turned off while the relay is in an on state, determining whether a particular in-vehicle equipment configured to operate after the main switch is turned off is present among the one or more pieces of in-vehicle equipment; and when the particular in-vehicle equipment is present, supplying electric power from the high-voltage battery to the particular in-vehicle equipment while maintaining the relay in the on state.

12. A non-transitory computer-readable storage medium storing instructions that, when executed by one or more processors of a computer of an electric power supply device installed in a vehicle, cause the one or more processors to perform operations comprising:

determining a state of a main switch configured to operate a traveling system of the vehicle;

switching a relay, disposed between a high-voltage battery and one or more pieces of in-vehicle equipment, on or off based on the state of the main switch;

when the main switch is turned off while the relay is in an on state, determining whether a particular in-vehicle equipment configured to operate after the main switch is turned off is present among the one or more pieces of in-vehicle equipment; and when the particular in-vehicle equipment is present, supplying electric power from the high-voltage battery to the particular in-vehicle equipment while maintaining the relay in the on state.

* * * * *